United States Patent [19]

Kaehler

[11] Patent Number: 4,967,366

[45] Date of Patent: Oct. 30, 1990

[54] INTEGRATED GASOLINE DISPENSER AND POS AUTHORIZATION SYSTEM WITH UNATTACHED PIN PAD

[75] Inventor: David L. Kaehler, Greensboro, N.C.

[73] Assignee: Gilbarco Inc., Greensboro, N.C.

[21] Appl. No.: 322,221

[22] Filed: Mar. 6, 1989

[51] Int. Cl.[5] .......... G06F 15/20

[52] U.S. Cl. .......... 364/479; 235/381; 340/825.35; 364/465; 902/22

[58] Field of Search .......... 364/479, 465, 509; 235/375, 379, 380, 381, 382, 382.5; 340/825.35, 825.31, 825.33, 825.34, 825.69, 825.72; 902/5, 22, 30, 39

[56] References Cited

U.S. PATENT DOCUMENTS

| | | | |
|---|---|---|---|
| 3,906,447 | 9/1975 | Crafton | 340/149 A |
| 3,931,497 | 1/1976 | Gentile et al. | 235/381 |
| 4,223,830 | 9/1980 | Walton | 340/825.34 X |
| 4,236,068 | 11/1980 | Walton | 235/380 |
| 4,263,945 | 4/1981 | Van Ness | 141/98 |
| 4,277,837 | 7/1981 | Stuckert | 235/379 X |
| 4,345,146 | 8/1982 | Story et al. | 235/381 |
| 4,395,627 | 7/1983 | Barker et al. | 235/381 |
| 4,427,980 | 1/1984 | Fennell et al. | 340/825.52 |
| 4,464,651 | 8/1984 | Duhame | 340/825.69 |
| 4,490,798 | 12/1984 | Franks et al. | 364/550 |
| 4,499,464 | 2/1985 | Knox et al. | 340/825.72 |
| 4,523,087 | 6/1985 | Benton | 235/379 |
| 4,535,333 | 8/1985 | Twardowski | 340/825.69 |
| 4,589,069 | 5/1986 | Endo et al. | 235/381 X |
| 4,608,486 | 8/1986 | Berstein et al. | 235/379 X |
| 4,614,861 | 9/1986 | Pavlov et al. | 235/380 |
| 4,658,371 | 4/1987 | Walsh et al. | 364/550 |
| 4,672,375 | 6/1987 | Mochida et al. | 340/825.31 |
| 4,679,236 | 7/1987 | Davies | 235/382 X |
| 4,692,762 | 9/1987 | Lewiner | 340/825.69 |
| 4,712,105 | 12/1987 | Kohler | 340/825.69 |
| 4,719,460 | 1/1988 | Takeuchi et al. | 340/825.31 |
| 4,723,121 | 2/1988 | van den Boom | 340/825.31 |
| 4,727,368 | 2/1988 | Larson et al. | 340/825.31 |
| 4,734,896 | 3/1988 | Soma et al. | 340/568 |
| 4,742,351 | 5/1988 | Suzuki | 340/825.34 |
| 4,837,422 | 6/1989 | Dethloff et al. | 235/379 X |

*Primary Examiner*—Joseph Ruggiero
*Attorney, Agent, or Firm*—Kenneth Watov

[57] ABSTRACT

In a gasoline dispenser system, a dispenser head includes a PIN PAD for permitting a customer to privately enter their personal Identification Number into the PIN PAD at a location remote from the dispenser head, for permitting the PIN number to be transmitted to a receiver in the dispenser head, for processing via a point-of-sale authorization controller, to either authorize or deny a transaction between the customer and associated service station.

5 Claims, 8 Drawing Sheets

INTEGRATED GASOLINE DISPENSER AND POS AUTHORIZATION SYSTEM WITH UNATTACHED PIN PAD

MICROFICHE APPENDIX

Computer programs related to this invention are included in a microfiche appendix (not printed herein) on seven microfiche, with a total of 385 frames, pursuant to 37 CFR 1.96(b).

FIELD OF THE INVENTION

The field of the present invention relates generally to fueling islands for gasoline dispensing systems, and more particularly to apparatus in such systems for authorizing a sale to an identified customer.

BACKGROUND OF THE INVENTION

Customer activated point of sale (POS) systems have been developed for use in service stations. In one such system, a customer uses a keypad located at a credit authorization terminal (CAT) unit, to input the customers personal identification number (PIN). If the PIN is validated, a display on the system prompts the customer to key in a particular gasoline pump number, and optionally an amount to be dispensed. The CAT island card reader is programmed to authorize an in-station pump controller to activate the selected pump, for permitting the customer to complete the requested transaction. Upon completion, the system provides for the customer to return to the CAT or island card reader, to operate the same for obtaining a receipt for the completed transaction.

Recently, gasoline dispensing systems are being developed to incorporate prior stand alone island card reader peripherals into the heads of multi-product gasoline dispensers. For example, Gilbarco, Inc. is in the process of developing a CRIND (Card Reader In A Dispenser) for including in the head of a Gilbarco multiproduct dispenser, a customer display, keypad, card reader, receipt printer, and the required logic boards for permitting a customer to initiate a transaction at a pump in a manner similar to that required at an island card reader or individual CAT. The CRIND device or system is being developed to eliminate customer confusion caused by requiring customers to enter a pump number, and to reduce transaction time. In the CRIND system, the pump being activated is assumed to be the one associated with the particular CRIND device. Also, another advantage of the CRIND device or system being developed is that a customer is not required to walk across the forecourt in order to initiate a transaction or obtain a receipt. In 1987, another gasoline dispenser manufacturer, namely Dresser-Wayne, Inc., Salisbury, Md., Austin, Tex., began marketing a CRIND-like device on their MGD dispensers. However, no such known systems include or recognize the benefits of integrating a remotely controlled and portable PIN Pad feature into such CRIND-like devices or systems.

SUMMARY OF THE INVENTION

With the problems in the prior art in mind, various objects of the invention are as follows:

An object of the invention is to provide an improved POS authorization system for use with fuel dispensing systems.

Another object of the invention is to provide integral with a head of a fuel dispenser, a POS authorization system including an unattached PIN Pad.

Another object of the invention is to provide an improved POS authorization system in a fuel dispensing system, for use by a customer in a self-service station mode, and/or by an attendant in an attended or self-service mode.

These and other objects of the invention are provided by a non-integrated, portable customer-activated terminal and an integrated customer/attendant-activated terminal with a data receiving port in the head of the fuel dispenser unit, for providing at one unit in the dispenser the functions of customer-activated and/or attendant-activated POS transactions, in a manner enhancing the efficiency of making such transactions by reducing the manual activity or movement to a minimum.

Brief Description of the Drawings

Various embodiments of the present invention will be described below with reference to the drawings, in which like items are identified by the same reference number, and in which.

Detailed Description of the Preferred Embodiments of the Invention

Figure 1:
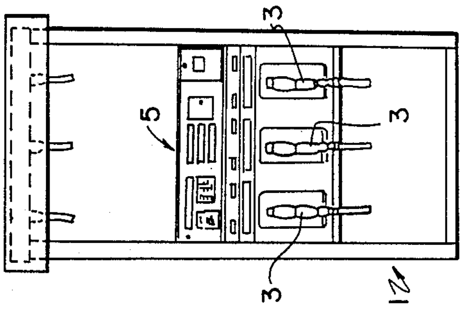
FIG. 1 is a partial front elevational view of a multiple product dispenser system incorporating the present invention.

With reference to FIG. 1, for purposes of illustration, a multiple product dispenser system 1 is shown. Three independent fuel dispensing nozzles 3 are included for individually dispensing different grades of gasoline, in this example. The dispensing system or head 1 also includes a control module 5 to be operated by either an attendant or a customer. A magnified view of the layout of the control panel or module 5 is shown in FIG. 2.

Figure 2:
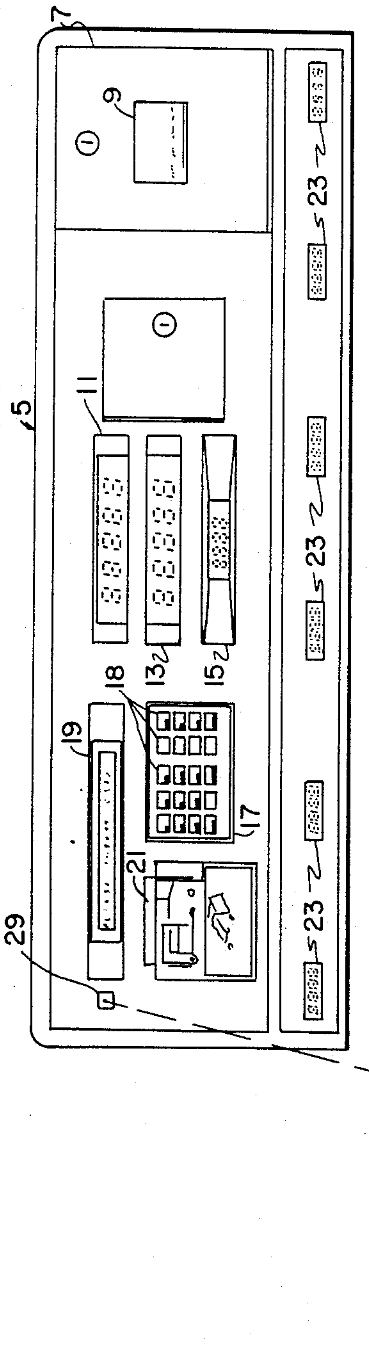
FIG. 2 is a magnified front-elevational view of a CRIND or "Credit Card Reader In A Dispenser" shown in FIG. 1, including the present invention.

With reference to FIG. 2, the control module 5 includes a receipt section 7 having a liftable door 9 for receiving a receipt from a printing mechanism (not shown) located within the printer section 7. Also, a display 11 is provided for reading out the total price for the gasoline dispensed up to a given time on a cumulative basis in real time; a display 13 for reading out the number of gallons dispensed at any given time on a cumulative basis; a display 15 for reading out the price per gallon of the gasoline being dispensed; a keypad 17 for permitting manual entry amongst other things of a preset amount of gasoline to be dispensed, a personal identification number, and so forth; a display 19 for prompting a user in the sequential steps required for operating the control panel 5 in order to energize a pump (not shown) for delivering fuel under pressure to the appropriate one of the nozzles 3 for dispensing the fuel or gasoline to a receiving tank; a slot 21 for receiving a credit card for entry into a card reader (not shown); and six displays 23 for displaying numerically the price per gallon for either cash or credit sales for delivery of fuel from associated ones of the nozzles 3, in this example. The various portions of the panel 5 just described are typical of the features found in a CRIND (Card Reader In A Dispenser) being developed by Gilbarco, Inc., Greensboro, N.C. since 1984. The present inventor, with reference to FIG. 2, further developed such CRIND devices by incorporating an unattached PIN Pad system in an improved CRIND module.

A portable or unattached remotely controlled PIN Pad 25, as held in a user's hand 12, is shown below the control panel 5. In this example, the portable PIN Pad 25 is being held in a manner for directing an infra-red beam of light 27 to a data transfer window 29 provided on the control panel 5. The infrared beam is modulated by digital data representative of the PIN number inputted into the keypad by a customer, as will be described below. Electronic devices and circuitry are located behind the data transfer window 29 for converting the infra-red coded light beam 27 into electrical signals for processing, as will be described.

Figure 3:
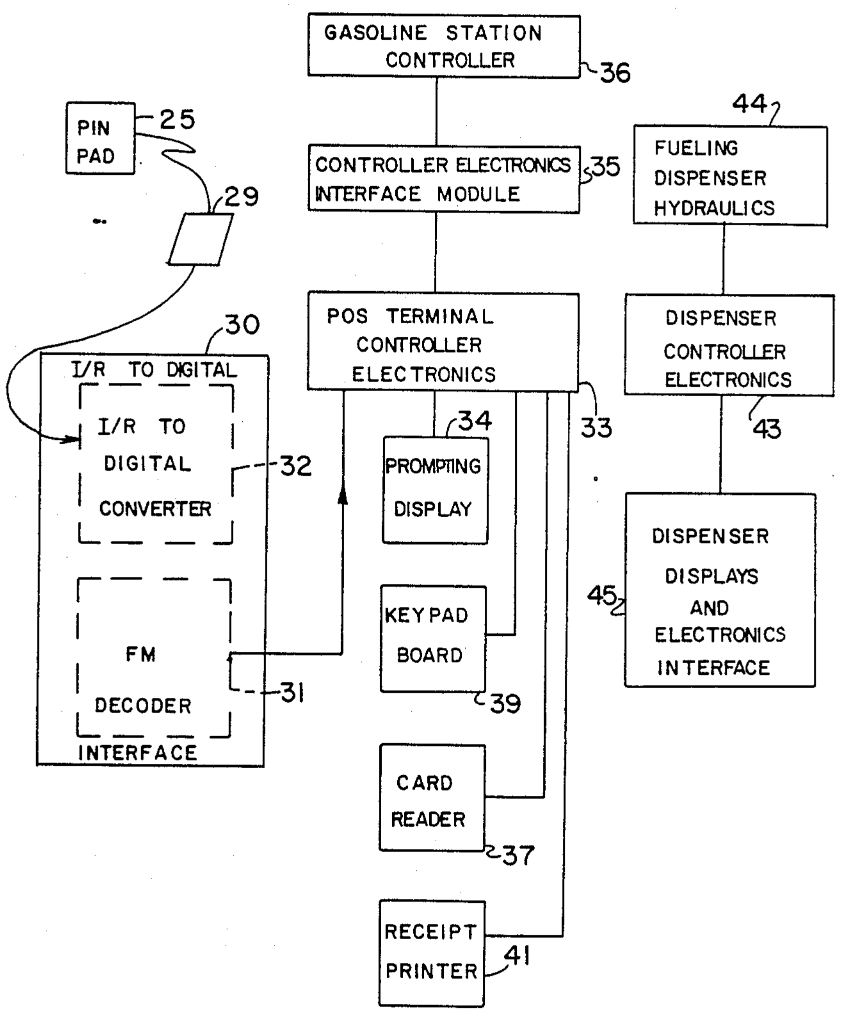
FIG. 3 shows a functional block diagram of the POS transaction system shown in FIG. 1, including various embodiments of the present invention.

In FIG. 3, a block diagram is shown of the basic subsystems of the improved CRIND module of the present invention. The unattached portable PIN Pad is provided in a prototype system by a model HT204881-2 PIN Pad, manufactured by "Hamilton Test Systems", Tucson, Ariz. Note that although infra-red data transmission is illustrated in this example for transmitting data from the PIN Pad 25 to the data transfer window 29, the system may be modified for transmitting such data acoustically, or by a radio frequency wave, for example.

Figure 4A:
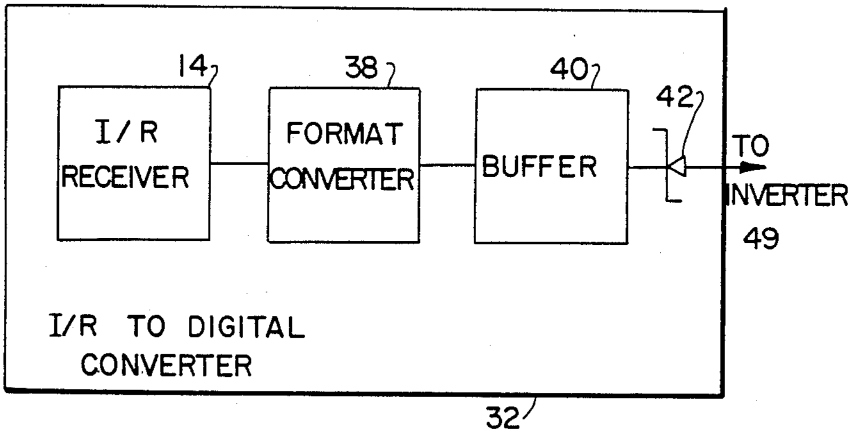
FIG. 4A shows a block-schematic diagram of an I/R-TO-DIGITAL INTERFACE module of one embodiment of the invention.

A Gilbarco T17344 I/R-to-digital interface module board 30 includes an FM decoder circuit 31, and an I/R-to-digital converter 32. The I/R-to-digital converter 32 used to convert the infra-red signals received from PIN Pad 25 into digital signals. Converter 32 is described in greater detail below with reference to FIG. 4A.

Figure 4B:
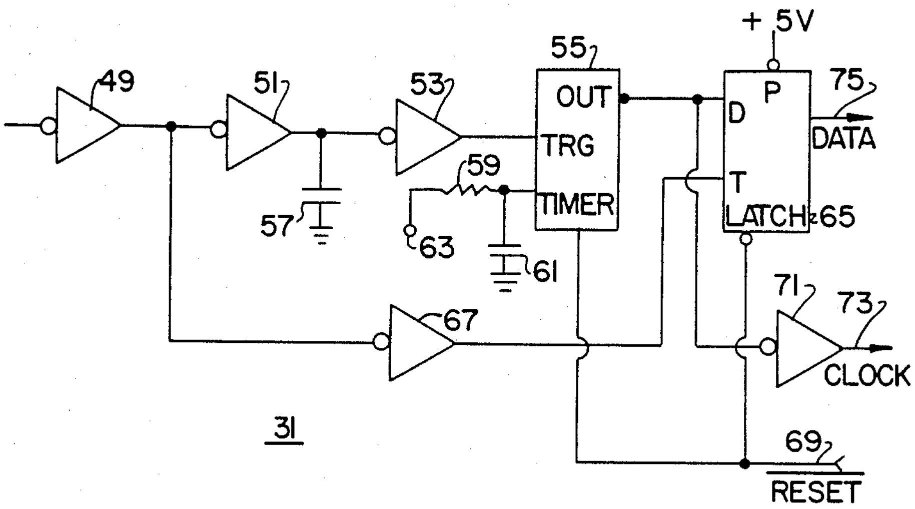
FIG. 4B shows a block-schematic diagram of an FM decoder circuit included in one embodiment of the invention.
Figure 7:
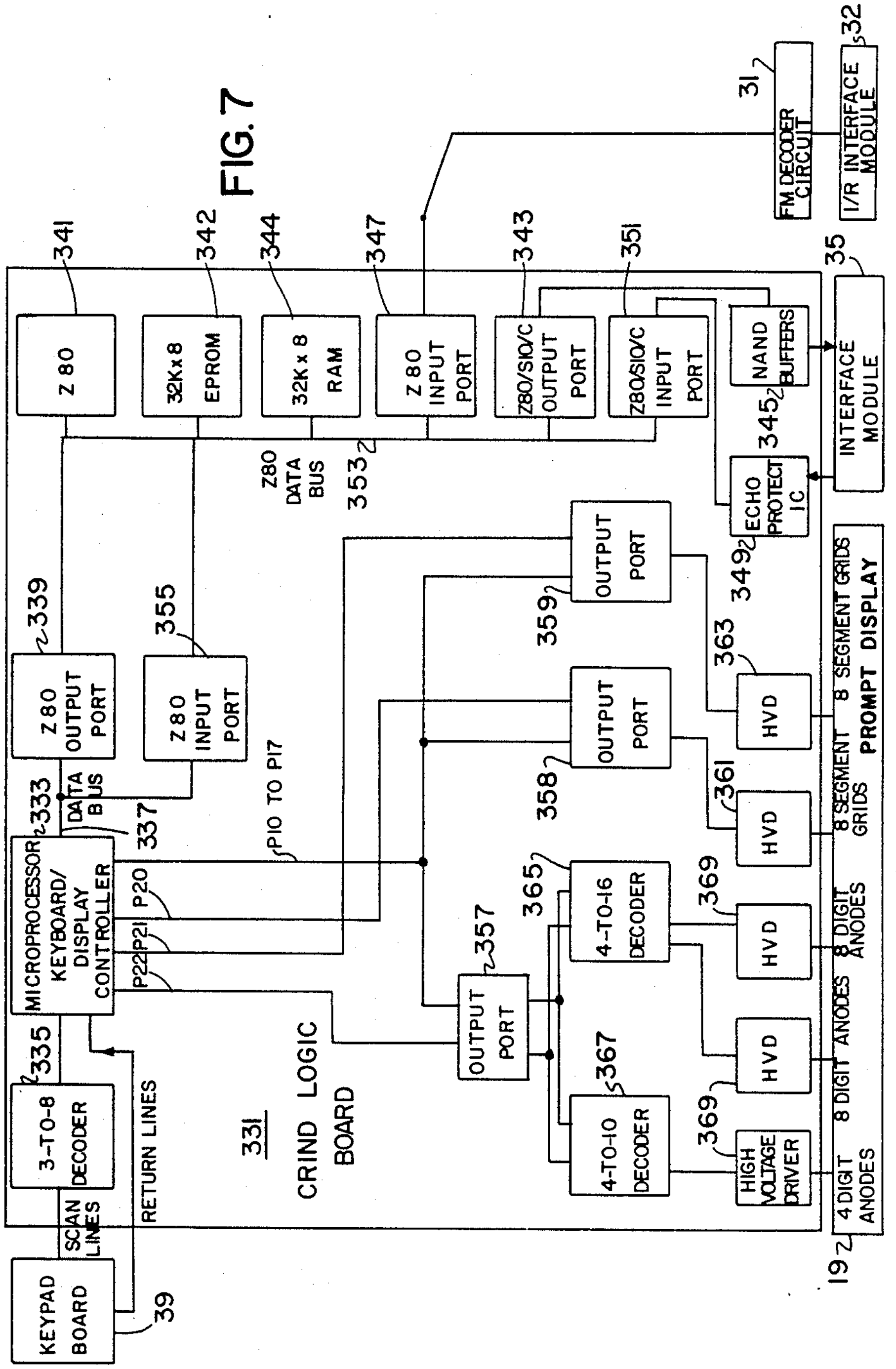
FIG. 7 shows a block schematic diagram of a logic board network for one embodiment of the invention.
Figure 8:
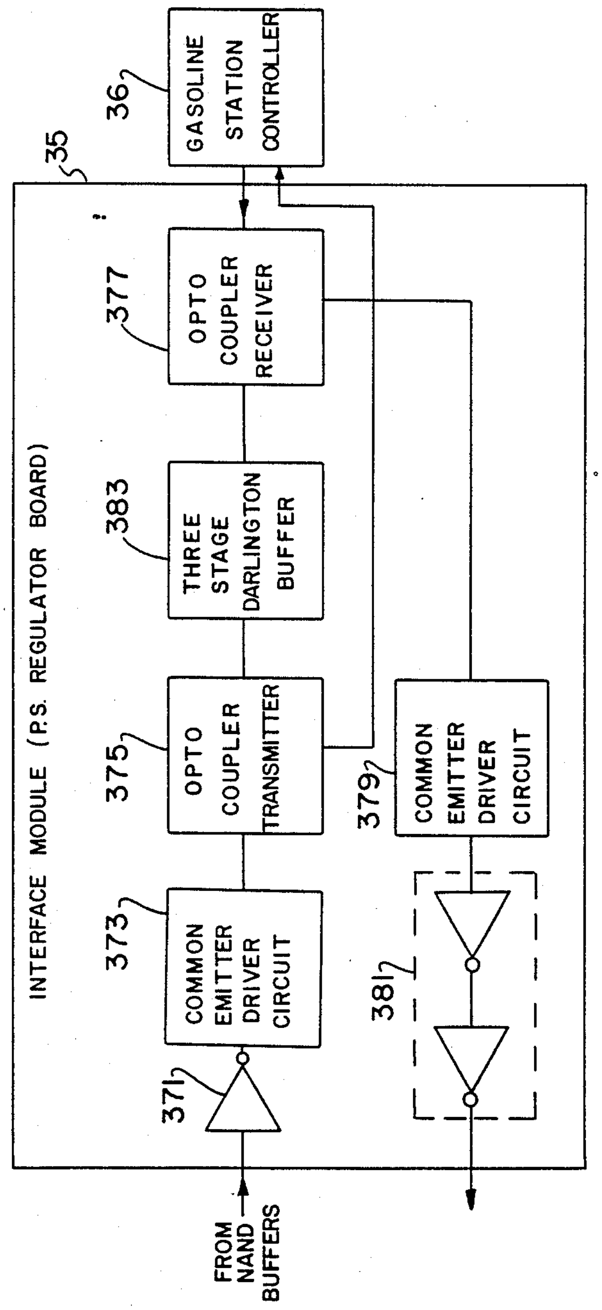
FIG. 8 shows a block schematic diagram of an interface module for one embodiment of the invention.

FM decoder circuit 31, described below in detail with reference to FIG. 4B, is used to decode the digitized infra-red data signal beam 27 from converter 32 into electrical data signals, which are applied therefrom to a POS terminal controller 33 electronic system (including a Gilbarco T16785 CRIND logic board 331, shown in FIG. 7, and a Gilbarco T16973 CRIND expansion board, not shown).

The POS terminal controller electronics 33 are connected via an interface circuit 35, provided by Gilbarco power and interface module W02135. Note that all subsequent parts or model numbers given herein are Gilbarco part or model numbers assigned to a CRIND system developed by Gilbarco, Inc., Greensboro, N.C. The controller electronics 33 are also connected to a Gilbarco T16911 CRIND display electronics board 34, for driving the display 19; to an integral card reader and electronic board 37, Gilbarco part number T16934; to an electronic interface and integral keypad board 39 provided in this example by Gilbarco part number T16386 (designated as a membrane switch module which includes keypad 17): and to a receipt printer and an electronics interface module 41 provided by Gilbarco part number W02133. The controller 33 is also connected to a dispenser controller electronic subsystem 43, the latter including three Gilbarco electronic modules designated as a T15841 pump control, a T15849 hydraulic interface, and a T15857 main regulator. The dispenser controller electronics 43 provides signals for driving fueling dispenser hydraulics 44, a main display part number W02107 (shown in FIG. 5 as display 11), and price per unit display modules 23 (Gilbarco part number T16940).

Mounted directly behind the data transfer window 29 is a BX-1466 1/R Receiver 14 manufactured by Sony Corporation of Japan (see FIG. 4A), forming a portion of I/R-to-digital converter 32. I/R receiver 14 converts the I/R signals 27 into electrical digital data signals which are passed through a standard 8751 format converter 38. The format conversion is from Hamilton Test System's unique format for PIN Pad 25 to a standard FM format (see Source Code Listing in Microfiche Appendix for ALPHA PIN.LST). The reformatted data is passed through a 74HC3651 buffer 40, and Schottky diode 42, to FM decoder circuit 31. The latter includes three inverters 49, 51, 53, connected in series, as shown for delivering data signals from the interface module 32 to a trigger (TRG) terminal of a standard 555 timer integrated circuit timer 55.

FM decoder circuit 31 further includes an integrating capacitor 57 connected between the common connection of the inverters 51, 53 and a point of reference potential, ground in this example. Timing for the timer chip 55 is controlled by the combination of resistor 59 and capacitor 61 connected in series between a positive voltage terminal 63 for connection to a positive voltage $+V$, and a point of reference potential at the other end of capacitor 61. The common connection between resistor 59 and capacitor 61 is connected directly to the timer chip 55. The output terminal of the timer 55 is connected to a latch 65, provided in this example by an integrated circuit LS74 latch. Note that the output pulses provided from timer chip 55 have a pulse width predetermined to be less than 2.5 milliseconds.

The common connection between inverters 49 and 51 is connected to the input terminal of another inverter 67, the output terminal of which is connected to the "T" terminal of the latch 65. The reset or "R" terminals of timer chip 55 and latch chip 65 are connected in common to a reset line 69 designated as a $\overline{\text{RESET}}$. The common connection between the output terminal of timer 55 and D input terminal of latch 65 is connected to the input terminal of an inverter 71, the output of which is connected to a clock line 73 for outputting clock signals. A data output line 75 is connected to the "Q" output terminal of latch 65. The POS terminal controller electronic module 33 is connected via output data line 75 to latch 65, to clock line 73, to the reset line 69, and to an LP365 power failure detection circuit (not shown).

As previously mentioned, the primary function of the customer prompting display 19 and electronics interface 5 (control panel), and the associated unattached PIN Pad 25, is to collect customer data, provide all communications necessary with the controller (not shown), typically located in the kiosk of the gasoline station, in order to obtain authorization and denial of a customer's intended means of payment, and to provide a transaction receipt after the sale. In general terms, the control panel 5, via its location in the dispenser head 1, provides for efficient collection of customer data. A given transaction is first initiated by either a customer or attendant entering data required for authorization into the control panel 5, and inserting a credit card upon prompting to do so by display 19, into the credit card reader 21, unless a cash payment is to be made.

Assuming a credit card sale, the customer waits for authorization to be indicated on the prompting display 19, whereupon the appropriate gasoline pump (not shown) is activated, for permitting a customer to dispense fuel from the appropriate one of the nozzles 3 into the customers vehicle. The customer, after filling his storage tank as required, replaces the nozzle 3 into the appropriate holder, and lifts the small door 9 for obtaining a receipt from the receipt printer located in the module 7, thereby completing the transaction. Alternatively, an attendant may perform the various customer related activities, with the exception of entering the customers PIN number, as will be described in greater detail below.

The operation of the control panel 5 will now be described in greater detail. Depending upon the State in which a particular gasoline dispensing system is located, the particular gasoline dispenser 1 may be either attendant activated or customer activated. In a customer-activated gasoline dispenser 1, in using the present invention, a customer is prompted by the prompting display 19 to enter the customer's PIN number into the system via the integral CRIND keypad 17. In this example, the keypad is a membrane type keypad. As shown in FIG. 3, the membrane type keypad 39 is directly connected to the POS terminal controller electronics 33, for encrypting the PIN data into the Gilbarco T16785 logic board. In an attendant-activated situation, the customer's PIN number is entered into the POS controller 33 via a different method, as will now be described.

In an attendant-activated system, a typical transaction is initiated by the attendant walking to a customer's vehicle, and handing the customer the portable and remote unattached PIN Pad 25. In the privacy of the customer's own vehicle, the customer then enters their PIN number into the PIN Pad 25 via the keypad 26 located on the keypad (see FIG. 2). The PIN number is encrypted in the PIN Pad 25, which is handed to the attendant by the customer. In this example, the attendant then carries the PIN Pad to the control panel 5, aims a transmitting window on the top edge of the keypad 26 at the data transfer window 29 on the control module 5, and presses an appropriate enter key on the keypad 26, for transferring the PIN number via an infra-red wave 27, into the infra-red data receiver module 31 for format conversion via module 32 (See FIG. 4A), followed by decoding via the FM decoder 34 of FIG. 4B. As previously mentioned, the prototype infra-red receiving electronics 31 is presently assigned a Gilbarco part number T17344. The decoded signals are then transferred to the POS controller logic module 33, that is, more specifically to the logic printed circuit board designated by Gilbarco part number T16785, located therein. From this point on, further processing of the PIN number data is identical, regardless of whether derived via the just described attendant activated method, or the previously described customer activated method.

Assuming that the customer is paying via a credit card, the message display 19 shows a message requesting that the credit card be inserted into the slot 21 of the associated card reader 37. On insertion of the credit card, the card reader 37 (see FIG. 3) transmits or transfers the associated card account data to the POS controller 33. The POS controller 33 responds by transmitting the encrypted PIN number and the credit card account number to the system site controller 36 (not shown) via a prototype gasoline station controller electronics interface module 35, presently assigned a Gilbarco part number W02135. The interface 35 includes both a power supply for the control panel 5, and the communications interface with the site controller 36, in this example. The site controller is programmed to communicate with an appropriate banking data network for confirming both the PIN number and the credit card account efficacy, and thereafter authorizing the transaction or denying the same, if appropriate. The authorization or denial signal is sent to the site controller 36, and returned therefrom via the interface module 35, for delivery to the POS controller 33, which is programmed to respond to the instruction signal by indicating on the prompting display 19 authorization or denial of the transaction. Assuming the transaction is authorized, the attendant or customer is then prompted by the visual display 19 for carrying out the remainder of the dispensing operation, which is terminated via the delivery of a receipt under the door 9, as previously mentioned. As indicated, throughout the entire transaction, the customer PIN data is maintained in secrecy.

As previously indicated, the portable PIN Pad 25 is not limited to such a pad 25 for transmitting encrypted data via infra-red transmission. Acoustical or radio frequency transmission could also be used, which would require that the receiver electronics 31 be modified for such alternate receipt of transmitted data.

Figure 5:
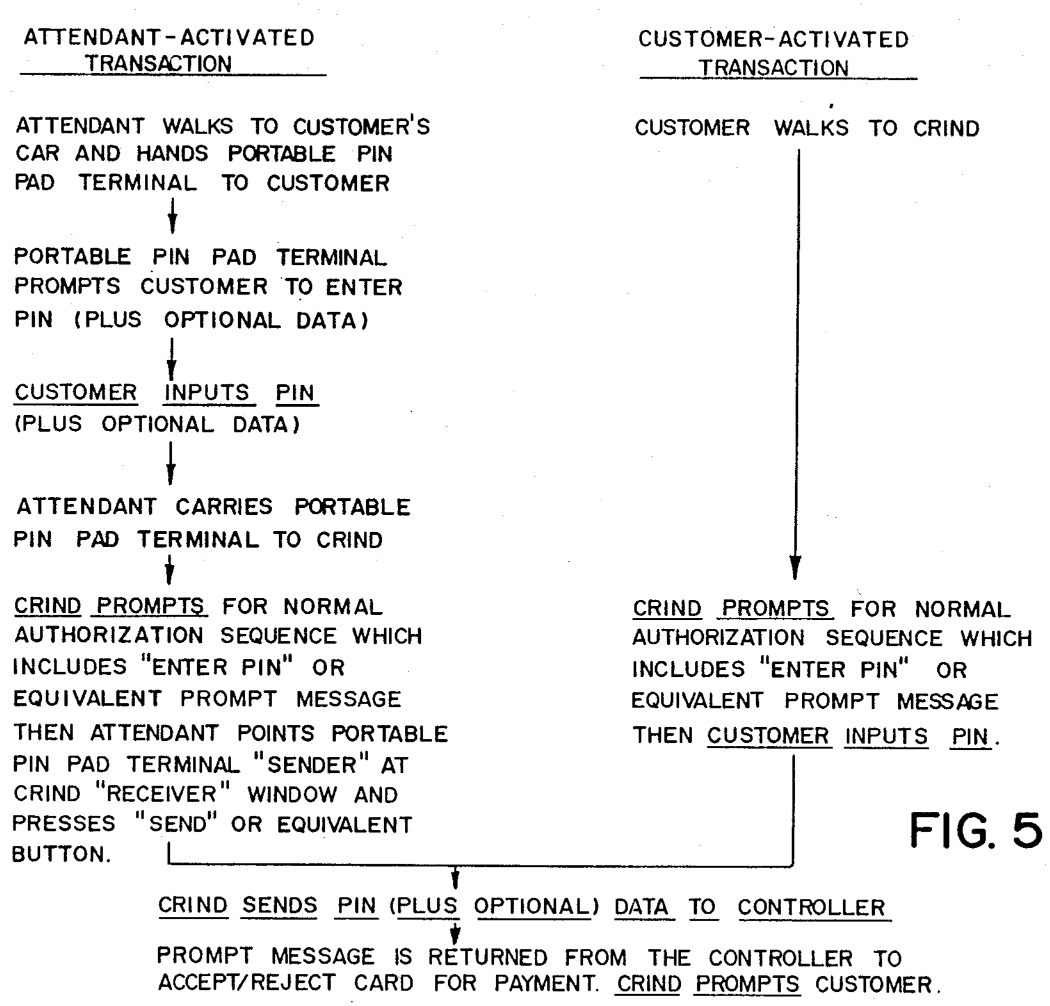
FIG. 5 shows a simplified word flowchart for attendant and customer activated transaction steps of one embodiment of the invention.
Figure 6:
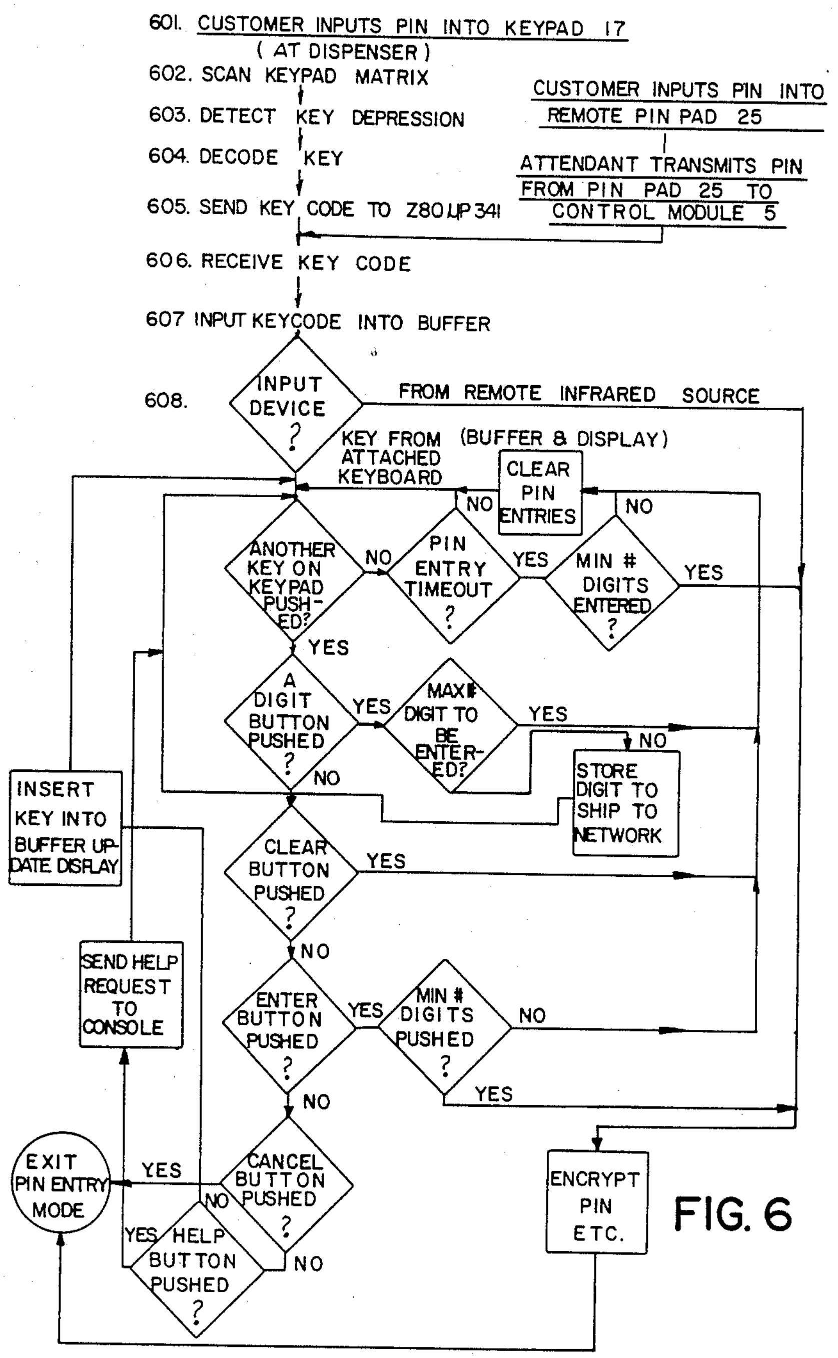
FIG. 6 shows a detailed flowchart for the embodiment of FIG. 5.

In FIG. 5, a simplified word flowchart shows the basic sequence of operations for either an "attendant-activated transaction" using PIN Pad 25, or a "customer-activated transaction" using keypad 17. With reference to FIG. 6, a detailed flow chart is shown for illustrating the basic programming steps required for entering the PIN data into controller 5. FIG. 6 shows a more detailed flowchart for the programming steps required to carry out the subject transactions. In FIG. 6, steps 602 through 605 are under the control of microprocessor 333 (see FIG. 7); steps 606 and 607 are under the control of Z80 microprocessor 341, as are steps 608 onward. The programming for steps 602 through 605 are shown in the microfiche appendix under "PROGRAM.LST"; steps 606 and 607 under "KEYBOARD.LIS"; and steps 608 onward under "APP.BUTTONS.LIS".

Figure 9:
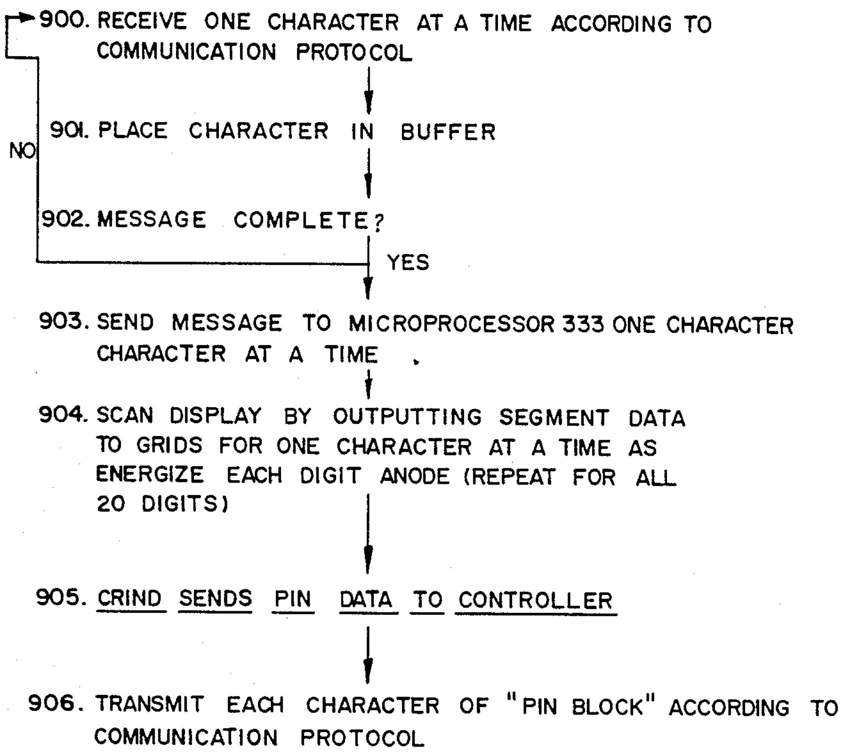
FIG. 9 shows a word flowchart for a programming sequence of one embodiment of the invention.

The "CRIND PROMPTS" steps shown in FIG. 5, are shown in greater detail in FIG. 9. The Z80 microprocessor 341 is programmed for controlling steps 901 through 903 (see microfiche appendix for "DISPLAY.LIS"). The 8749 microprocessor 333 is programmed for controlling step 904 (see microfiche appendix for "PROGRAM.LST"). Also, step 906 is controlled via programming of the Z80 microprocessor (see microfiche appendix for "TINET.ISR.LIS" and "TINET.TSK.LIS").

Operation of the dual path authorization scheme of the present invention will now be described in detail. With reference to FIGS. 5 through 9, the integral keypad board 39 is scanned under control of the previously mentioned T16785 CRIND logic board 331 on controller 33, by an 8749 standard microprocessor 333 programmed as a keyboard display controller (see source code listing, "PROGRAM.LST"). Note that the source code listings are not printed herein, but are included as a microfiche appendix retained in the U.S. Patent and Trademark Office. Output strobes from microprocessor 333 are decoded by a standard 74HC138 3-to-8 decoder 335, and returned through any closed keypad switch of keypad 17 to inputs P24 through P27 (not shown) on microprocessor 333. A code representation of the pressed one of keys 18 is passed via a standard 8749 microprocessor data bus 337 to a 74HC574 data input port 339 on the Z80 databus (see source code listing, "KEYBOARD.LIS"), and interpreted with regard to PIN entry (see microfiche Appendix "APP BUTTONS.ASM"). The Z80 microprocessor 341 (see appended microfiche source code listings, "TINET ISR.-LIS" and "TINET TSK.LIS") is programmed to serialize the data through a standard Z80/S10/C output port 343, to standard 74HC0.3 buffer NAND gates 345. This data output from the latter is received at Interface Module 35 (see FIG. 8), which converts the data for current loop communications to the station controller 36, through a standard 74HC04 inverter 371, to an MPS-A13 transistor drive circuit 373, to a standard MCT2E opto-isolator 375 to station controller 36.

The remote PIN Pad data 27 (see source code listing in microfiche appendix, "ALPHA PIN.LST") is passed from the I/R interface module 32 to the FM decoder circuit 31, to the CRIND logic board 331 of controller 33. The Z80 microprocessor 341 receives the data through a 74HC245 input port 347, stores it in a buffer (not shown), and then sends the data (see microfiche appendix for source code listings, "TINET ISR.LIS" and "TINET TSK.LIS") through a Z80/SIO/C output port 343 to the standard serial buffer NAND gates 345. The data is transferred therefrom to interface Module 35 and converted for current loop communications to the station controller 36, through the 74HC04 inverter 371, to the MPS-A13 transistor drive circuit 373, to an MCT2E opto-isolator 375, to an output connector (not shown), for connection to station controller 36.

Message communications for prompting, e.g. to indicate payment is authorized after verifying the customer's PIN, are received at the interface module 35 by an opto-isolator MCT2E 377 and passed on through a standard 2N2907 common-emitter transistor driver 379 and two serial 74HC04 inverter buffers 381, to logic board 331 of controller 33. Note that a three-stage 2N222A Darlington Buffer 383 is used to connect signals from optocoupler 375 to opto-coupler 377. The data is received at logic board 331, inverted and NANDED by a standard 74HC03 integrated circuit 349 with an echo protect feedback passed through a standard HSC1001 Zener diode from a transmission output at NAND 345 (to prevent this board's transmissions from being picked up erroneously as receive data from the interface module 35). This data is passed through a standard Z80/SIO/C input port 351 to the Z80 microprocessor data bus 353 (see microfiche appendix for source code listings, "TINET ISR.LIS" and "TINET TSK.LIS") and through a standard 74HC574 data input port 355 (see microfiche appendix for source code listing, "DISPLAY.LIS") to the 8749 microprocessor 333. Microprocessor 333 (see appendix for source code listing, "PROGRAM.LST") outputs the data to the prompt display 19 via three parallel 74HC574 output ports 357, 358, 359, each of which is selected by an individual select output signal line, P20 to P22. Two of these output ports 358 and 359 pass sixteen drive signals through two standard UDQ6118A high voltage buffer circuits 361, 363, respectively, to drive the fourteen segment and decimal point and comma anodes of the prompt display 19. The third output port 357 feeds a standard 74HC4514 4-to-16 decoder 365 and a standard 74HC4028 4-to-10 decoder 367 (used as a high order 2-to-4) to supply twenty grid select signals to three standard UDQ6118A high voltage buffer circuits 369 to drive each of the twenty digit select grids (not shown) of prompt display 19. Note also that an EPROM 342 and RAM 344 are used for program and operating memory storage, respectively.

Although various embodiments of the present invention have been described and illustrated herein, they are not meant to be limiting, and other embodiments or various modifications thereof that may occur to one of ordinary skill in the art are meant to be covered by the spirit and scope of the appended claims.

What we claim is:

1. In a gasoline station fueling island, a gasoline dispenser head including a point-of-sale authorization (POS) terminal, the POS terminal including a message display for operational prompting, a keypad, a card reader for reading customer's credit cards, and a printer for providing transaction receipts, wherein the improvement comprises:

portable PIN Pad means for providing in an attendant-activated mode of operation, means for a customer to privately and confidentially enter the customer's personal identification data or number (PIN) outside the view of the attendant, the PIN being encrypted in said PIN Pad means, whereafter the customer hands the PIN Pad means to the attendant;

transmission means included in said PIN Pad means for permitting said attendant to remotely transmit the customer's encrypted PIN number to said POS terminal;

first receiving means included in said POS terminal for receiving and decoding the encrypted PIN data transmitted from said PIN Pad means;

controller means included in said POS terminal and connected to said first receiving means, for receiving said decoded encrypted PIN data from said first receiving means, and transmitting the same to a master controller of said gasoline station;

said controller means further including second receiving means for receiving back from said master controller, a control signal indicating whether the PIN number is authorized or denied;

display means located on said POS terminal, connected to said second receiving means, for receiving said control signal therefrom and visually indicating to a "user" whether authorization is confirmed or denied; and wherein said controller means of said POS terminal further includes for use in a customer activated mode of operation, third receiving means for receiving directly from said keypad of said POS terminal, PIN data entered into said keypad by said customer, for encrypting and transmitting the same to said master controller.

2. The improvement of claim 1, further including:

infra-red data transmission means in said portable PIN Pad for transmitting said PIN data to said POS terminal in the form of infra-red signals;

said first receiving means further including infra-red light detecting means, for converting the infra-red PIN signals to electrical signals, and means for decoding said electrical signals.

3. The improvement of claim 1, wherein said first receiving means includes an FM decoder.

4. The improvement of claim 1, wherein said first receiving means further includes means for receiving and decoding both said PIN data and credit card data from said card reader.

5. The improvement of claim 4, wherein said POS controller means further includes means for transmitting said credit card data to said master controller.

* * * * *